United States Patent Office 3,639,446
Patented Feb. 1, 1972

---

3,639,446
4,4'-DIBROMO- AND 4-CHLORO-4'-BROMO-BENZILIC ACID ESTERS
Kurt Gubler, Riehen, Switzerland, assignor to Geigy Chemical Corporation, Ardsley, N.Y.
No Drawing. Continuation-in-part of application Ser. No. 589,530, Oct. 26, 1966. This application Jan. 26, 1968, Ser. No. 700,750
Claims priority, application Switzerland, Dec. 13, 1965, 17,135/65; Feb. 2, 1967, 1,566/67; May 17, 1967, 6,921/67
Int. Cl. A01n 9/02; C07c 69/76
U.S. Cl. 260—473 A
9 Claims

ABSTRACT OF THE DISCLOSURE

Certain esters of 4,4'-dibromo- and 4-chloro-4'-bromobenzilic acids are disclosed as having useful acaricidal, and in the case of certain esters, also insecticidal activities superior to those of the corresponding esters of 4,4'-dichloro-benzilic acid. The preparation of the new esters, and compositions containing them as active ingredients as well as a method of controlling, in particular, Acarinae with the aid of the new esters, and a method of controlling certain insects, in particular the Colorado beetle on potato plants, with the aid of isopropyl 4,4'-dibromobenzilate are also described.

CROSS REFERENCE TO RELATED APPLICATION

This application is a continuation-in-part of our patent application Ser. No. 589,530, filed Oct. 26, 1966, now abandoned.

DETAILED DISCLOSURE

The present invention relates to esters of 4,4'-dibromobenzilic acid and 4-chloro-4'-bromobenzilic acid, their production, and to acaricidal and insecticidal compositions which contain such esters as active ingredients, as well as to methods for controlling spiders and certain insects with the aid of such esters.

Esters of 4,4'-dichlorobenzoic acid have been described as useful in the control of spiders and insects in U.S. Pat. 2,745,780. However, these esters must be applied in practice, especially in the control of Acarinae, in much larger amounts than the novel esters of the present invention, which fact renders it often difficult to avoid phytotoxic effects on cultivated plants, and especially on fruit trees.

It has now been found that certain esters of 4,4'-dibromobenzilic acid which are of the formula

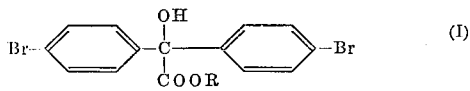

wherein R represents alkyl of from 1 to 4 carbon atoms, but preferably isopropyl, or halogenoalkyl of from 2 to 4 carbon atoms, or an alkenyl radical of from 2 to 5 carbon atoms or an alkinyl radical of from 3 to 5 carbon atoms, any substituents of which alkenyl and alkinyl radicals are halogen atoms, are, unexpectedly, excellently suitable in the control of Acarinae, especially mites and spiders, and their preliminary stages of development, even when applied to plants to be protected against these pests, in concentrations which are only about one-tenth or less of those required when the corresponding known esters of 4,4'-dichlorobenzilic acid are employed.

Moreover, in comparison with known benzilic acid esters, the new active substances have generally a much lower toxicity to warm-blooded animals. The $DL_{50}$ for rats of the novel isopropyl 4,4'-dibromobenzilate is, for instance, over 5,000 mg. of active substance per kg. body weight, while the acute toxicity of the known ethyl 4,4'-dichloro-benzilate is about 2,200 mg./kg.

The novel isopropyl 4,4'-dibromobenzilate, also has very satisfactory insecticidal properties against certain insects, for instance the Colorado beetle, while, in tests with the same insects, the other new esters, and especially the ethyl and the methallyl 4,4'-dibromobenzilates showed no insecticidal activity.

It has further been found that the new esters of 4-bromo-4'-chlorobenzilic acid of the formula

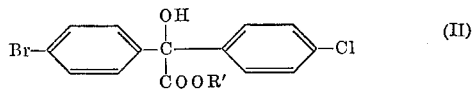

wherein R' represents an unsubstituted lower aliphatic hydrocarbon radical or one substituted by halogen, and preferably has the same meaning as in Formula I, are also superior in acaricidal activity and are much less phytotoxic than the corresponding esters of 4,4'-dichlorobenzilic acid.

Particularly, the known acaricidally active substances 4,4'-dichlorobenzilic acid ethyl ester and 4,4'-dichlorobenzilic acid isopropyl ester, may cause phytotoxic effects in various types of fruit trees, for instance peach trees, plum trees and apple trees even in the usually applied concentrations; while no phytotoxic effects are registered with a 0.05% suspension of the new compounds of Formulas I and II on plants and fruit trees even after they have been treated four times.

The new esters of 4,4'-dibromobenzilic acid and of 4-bromo-4'-chlorobenzilic acid are suitable for the control of normally sensitive and resistant mites of the Parasitiformes, Tetrabodili, Trombidiformes and Sarcoptiformes types. Their action is particularly marked against Trombidili, particularly against the Phylloxotrupa oleivorus Ashm. (citrus rust mite), also against Trombidiformes, e.g. against the Tetranychidae; not only the mobile stages thereof (larvae, protonymphs, deutonymphs, adults) but also the dormant stages (nymphochrysalis, deutochrysalis, teileiochrysalis) and the eggs are killed within a few days.

The new 4,4'-dibromobenzilic acid isopropyl ester is suitable for the control of normally sensitive and resistant mites on plants, trees and animals. Its action is particularly marked against Tetranychidae, not only against the mobile stages thereof (larvae, protonymphs, deutonymphs, adults), but also against the dormant stages (nymphochrysalis, deutochrysalis, teileiochrysalis) and especially against the eggs.

Tests made with normally sensitive spider mites and those resistant to known benzilic acid and phosphoric acid esters (Tetranychus urticae) show that application, till run-off, of aqueous compositions having as little as 0.005% weight/volume of one of the new active substances of Formulas I or II to trees infested by the mobile stages of these mites attains 100% killing after 24 hours, and also the dormant stages and eggs are 100% killed after a few days, which is not attained with the known 4,4'-dichlorobenzilic acid esters in the same concentration. Fruit trees, e.g. peach, plum and apple trees, treated with the new active substances according to the invention showed no phytotoxic effects after a treatment till run-off with a dispersion containing 0.05% weight/volume of active substance.

It has also been determined that some esters of 4,4'-dibromobenzilic acid and 4-bromo-4'-chlorobenzilic acid according to the invention have a good action against eating insects, in particular against insects of the families Curulionidae, Bruchididae, Dermestidate, Tenebrionidate and Chrysomelidae, e.g. granary weevils (Sitophilos granaria), bean beetles (Bruchidius obtectus), larder beetles (*Dermestes vulpinus*), yellow mealworms (*Tenebrio*), potato beetles (*Leptinotarsus decemlineata*) and their larval stages.

The acaricidal and insecticidal action of the new 4,4′-dibromobenzilic acid esters can be substantially improved, broadened and adapted to external circumstances by mixing them with synergists and other auxiliaries having a similar action such as succinic acid dibutyl ester, piperony butoxide, olive oil, peanut oil and also by the addition of esters and amides of phosphoric acid, phosphonic acid, thio- and dithio-phosphoric acid, carbamic acid esters, analogues of DDT active substance, pyrethrins and synergists thereof. In addition, the new active substances can be mixed and applied with substances having bactericidal, fungicidal or nematocidal properties, whereby a broadening of the biological activity is attained.

Suitable adjuvants to be used in such mixtures are, for instance, 3-allyl-2-methyl-4-oxocyclopent-2-en-1-yl ester of 2,2-dimethyl-3-(2′-methylpropenyl)-cyclopropane-carboxylic acid;
1,2,3,4,10,10-hexachloro-6,7-epoxy-1,4,4a,5,6,7,8,8a-octahydro-1,4-endo-exo-5,8-dimeethanonaphthalene;
6,7,8,9,10,10-hexachloro-1,5,5a,6,9,9a-hexahydro-6,9-methano-2,4,3-benzodioxathiepin-3-oxide;
1,2,3,4,10,10-hexachloro-6,7-epoxy-1,4,4a,5,6,7,8,8a-octahydro-1,4-endo-5,8-dimethanonaphthalene;
1,1,1-trichloro-2,2-bis-(p-methoxyphenyl)-ethane;

chlorinated terpenes or camphenes and mixtures thereof;

O,O-diethyl-S-(p-chlorophenylthio-methyl) phosphorodithioate;
O,O-diethyl-O(S)-(2-ethylmercaptoethyl) phosphorothioate;
O,O-diethyl-β-(2-isopropyl-6-methyl-4-pyriimidinyl) phosphorothioate;
3-(dimethoxyphosphinyloxy)-N,N-dimethyl-cis-crotonamdie;
O,O-dimethyl-S-(N-methylcarbamoylmethyl) phosphorodithioate;
O,O,O′,O′-tetraethyl-S,S′-methylene bis-phosphorodithioate;
O,O-dimethyl-S-4-oxo-1,2,3-benzotriazin-3(4H)-ylmethyl phosphorodithioate;
O,O-dimethyl-S-(1,2-dicarbethoxyethyl) phosphorodithioate;
O,O-diethyl-O-(p-nitrophenyl) phosphorothioate;
O,O-dimethyl-O-(2-carbomethoxy-1-methylvinyl) phosphate;
O,O-dimethyl-O-[2-chloro-2-(N,N-diethylcarbamoyl)-1-methylvinyl]-phosphate;
tetraethyl pyrophosphate;
1-naphthyl-N-methylcarbamate;
1-isopropyl-3-methylpyrazolyl-5-dimethylcarbamate;
calcium arsenate;
lead arsenate;
α-[2-(butoxyethoxy)-ethoxy]-4,5-methylenedioxy-2-(1-propyl)-toluene;
2-(2-ethoxyethoxy)-ethyl-3,4-methylenedioxyphenyl acetal of acetaldehyde;
2,4,4′,5-tetrachloro-diphenyl sulfone;
2-sec-butyl-4,6-dinitrophenyl-3-methyl-2-butenoate;
6-methyl-2,3-quinoxaline-dithiol cyclic-S,S-dithiocarbonate;
1,1,1-trichloro-2-hydroxy-2,2-bis-(β-chlorophenyl)-ethane, which are admixed in amounts in a proportion of from 2 to 5 times the amount of active substance according to the invention.

4,4′-dibromobenzilic acid esters are applied in the form of solid or liquid agents such as dusts, sprinkling agents, granulates and aqueous dispersions, which are obtained from wettable powders, pastes, emulsion concentrates, also as solution or aerosol.

The agents according to the invention are produced in the known way by intimately mixing and milling the active substance with suitable carriers, optionally with the addition of dispersing agents or solvents which are inert to the active substances. The concentration of active substance in these agents is, e.g. 0.01–80% and preferably 10% to 80%. The agents according to the invention can contain other biocidally active substances, also fertilisers, trace elements, etc.

The concentrated agents must be diluted to a content of about 1 to 100 grams of active substance per 100 liters in order to obtain preparations suitable for practical application in the field, e.g. on fruit trees, till run-off.

The new 4,4′-dibromobenzilic acid esters of general Formula I can be produced by reacting a compound of

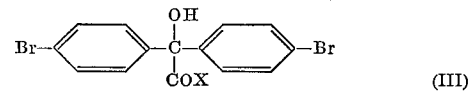

with a compound of the general formula $$R-Y \qquad (IV)$$

in which formulae X and Y are radicals which with the exception of an oxygen atom contained in one of these symbols are split off during the reaction, and R has the meaning given in Formula I.

In general Formulae III and IV, the symbols X and Y can be (a) Either both the hydroxyl group,
(b) One of the two can be the hydroxyl group and the other a halogen atom,
(c) One of the two can be the group O—Me wherein Me is a mobile radical which is split off as cation such as a metal atom, e.g. an alkali metal atom or the equivalent of an alkaline earth metal atom, and the other a halogen atom, or
(d) X can be the hydroxyl group and Y the diazo group.

It is of advantage to perform the reaction of the two starting materials in the presence of solvents or diluents which are inert to the reaction partners. As such can be used: hydrocarbons, halogenated hydrocarbons, amides such as dialkyl carboxylic acid amides, also ethers or ether-type compounds, or, in the case of (a) above, the corresponding alcohols. If the symbols X and Y have the meanings given in (a) or (b), then it is necessary to perform the process in the presence of an anhydrous acid or base. The following acids, for example, can be used: hydrohalic acids, sulfuric acid, etc.; and as bases inorganic bases such as alkali and alkaline earth metal hydroxides or oxides, and organic bases such as tertiary amines can be used.

In a preferred mode of carrying out the process according to the invention in practice, 4,4′-dibromobenzilic acid is reacted with a reactive ester of a low aliphatic alcohol in the presence of a base and an inert solvent. The main reactive esters which can be used are the esters of hydrochloric, hydrobromic or hydroiodic acid with methanol, ethanol, n-propanol or butanols, with alkenols such as allyl alcohol, methallyl alcohol, with alkinols such as propargyl alcohol and with the corresponding halogenated alcohols, also esters of sulfuric acid, particularly dimethyl sulfate and diethyl sulfate.

The new 4-bromo-4′-chlorobenzilic acid esters of Formula II are produced by rearranging 4-bromo-4′-chlorobenzil under alkaline conditions into 4-bromo-4′-chlorobenzilic acid or a salt thereof and then converting this intermediate product into an ester of the above general Formula II. To produce this ester in the second step, in general, the intermediate product, 4-bromo-4′-chlorobenzilic acid or a derivative of the general formula

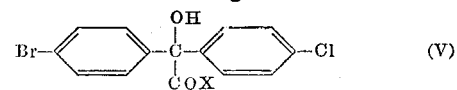

is reacted with a compound of the general formula $$R'—Y \qquad (VI)$$

in which formulae X and Y are radicals which with the exception of an oxygen atom contained in one of these radicals, are split off during the reaction, and R' has the meaning given in Formula II.

In the above formulas, R' represents an alkyl radical such as methyl, ethyl, propyl, isopropyl or a butyl radical; an alkenyl radical such as allyl and methallyl; or an alkinyl radical such as propargyl. Also, R' can represent a corresponding halogenoalkyl, halogenoalkenyl or halogenoalkinyl radical.

In the general Formulae V and VI, the symbols X and Y can represent:

(a) either both the hydroxyl group,
(b) One of the two the hydroxyl group and the other a halogen atom,
(c) One of the two the group O—Me wherein Me represents a mobile radical which is split off as cation such as a metal atom, e.g. an alkali metal atom or the equivalent of an alkaline earth metal atom, and the other a halogen atom,
(d) X the hydroxyl group and Y the diazo group.

The conversion of 4-bromo-4'-chlorobenzil into the new 4-bromo-4'-chlorobenzilic acid is performed under the reaction conditions generally used for "benzilic acid rearrangements," in particular by heating with alcoholic alkali hydroxide solution.

It is advantageous to perform the subsequent esterification in the presence of solvents or diluents which are inert to the reaction partners. As such can be used: hydrocarbons, halogenated hydrocarbons, amides such as dialkyl carboxylic acid amides, also ethers or ether-type compounds or, in the case of (a) above, the corresponding alcohols. If the symbols X and Y have the meanings given under (a) and (b), then it is necessary to perform the process in the presence of an anhydrous acid or base. The following, for example, can be used as acids: halogen hydracids, sulphuric acid etc. and, by bases, are meant inorganic bases such as alkali and alkaline earth metal hydroxides or oxides, and organic bases such as tertiary amines.

In a preferred embodiment of the esterification, 4-bromo-4'-chlorobenzilic acid is reacted with a reactive ester of a low aliphatic alcohol in the presence of a base and of an inert solvent. Reactive esters of low alcohols are, primarily, the esters of hydrochloric, hydrobromic or hydroiodic acid with methanol, ethanol, propanols or butanols, with alkenols such as allyl alcohol, methallyl alcohol, with alkinols such as propargyl alcohol, and with the corresponding halogenated alcohols, also esters of sulphuric acid, in particular dimethyl and diethyl sulphate.

The 4-bromo-4'-chlorobenzil serving as starting material for the process according to the invention is known (Journ. Chem. Soc. 1963, 1371) and is produced, according to this citation, by a complicated process by oxidation of the corresponding oxazole.

It proved more advantageous however, to produce the 4-bromo-4'-chlorobenzil mentioned from 4-bromobenzyl-4'-chlorophenyl ketone by oxidation with the usual oxidising agents such as selenium dioxide and similar compounds. In its turn, the ketone mentioned has not hitherto been described and it is obtained by reacting 4-bromophenyl acetic acid halide with 4-chlorobenzene in the presence of a Lewis acid such as aluminium chloride. Good yields are obtained. Naturally, 4-bromo-4'-chlorobenzil can equally well be produced by oxidation of 4-chlorobenzyl-4'-bromophenyl ketone, which latter is again accessible by reaction of 4-chlorophenyl acetic acid halide with 4-bormobenzene in the presence of AlCl$_3$.

The following non-limitative examples describe the production of the new active substances, as well as forms for application in which the active substance can be used in plant protection. Where not otherwise expressly stated, parts and percentages are given by weight and the temperatures are in degrees centigrade.

EXAMPLE 1

10.4 parts of 4,4'-dibromobenzilic acid are dissolved in 150 parts by volume of dimethyl formamide. 1.6 parts of potassium hydroxide are added to this solution. 4.3 parts of methyl iodide are then added dropwise to the clear solution and the mixture is stirred for 5 hours at 50–60°. The mixture is then poured into ice water and extracted several times with diethyl ether. The combined ether extracts are then washed once with 2 N sodium hydroxide solution and ice and then washed neutral with water, dried, the solvent is distilled off and the residue is fractionated. The 4,4'-dibromobenzilic acid methyl ester obtained boils at 166°/0.005 torr.

4,4'-dibromobenzilic acid methyl ester can also be obtained by reacting an aqueous solution of the potassium salt of 4,4'-dibromobenzilic acid with dimethyl sulphate.

EXAMPLE 2

15 parts of 4,4'-dibromobenzile acid are dissolved in 150 parts by volume of dimethyl formamide. 2.2 parts of potassium hydroxide are then added to this solution. When the potassium hydroxide has completely dissolved, 6.7 parts of ethyl iodide are added and the mixture is stirred for 5 hours at 50 to 60°. The mixture is then poured into 500 parts by volume of water and the solution is ethered out. The combined ether extracts are then washed twice with water and dried. The solvent is distilled off and the residue is fractionated. The 4,4'-dibromobenzilic acid ethyl ester obtained boils at 151–153°/0.03 torr.

4,4'-dibromobenzilic acid ethyl ester can also be obtained by reacting 4,4'-dibromobenzilic acid in benzene solution with ethyl alcohol in the presence of catalytic amounts of concentrated sulphuric acid.

EXAMPLE 3

14.5 parts of 4,4'-dibromobenzilic acid are dissolved in 150 parts of dimethyl formamide. 2.1 parts of potassium hydroxide are added to this solution. 5.7 parts of n-butyl bromide are added dropwise to the clear solution and the mixture is stirred for 5 hours at 50–60°. The mixture is then poured into ice water and extracted several times with diethyl ether. The combined ether extracts are then washed twice with 2 N sodium hydroxide solution and ice and then washed neutral with water. After drying, the solvent is distilled off and the residue is fractionated. The 4,4'-dibromobenzilic acid-n-butyl ester obtained boils at 170°/0.006 torr.

4,4'-dibromobenzile acid-n-butyl ester can also be produced by reacting 4,4'-dibromobenzilic acid chloride with n-butanol or with sodium-n-butylate.

EXAMPLE 4

First method 15 parts of 4,4'-dibromobenzilic acid and 2.2 parts of pulverised potassium hydroxide are dissolved while heating in 150 parts by volume of dimethyl formamide. 6.6 parts of isopropyl iodide are then added dropwise to this solution while stirring. The reaction mixture is then heated for 5 hours at 50–60° while continuously stirring. The suspension is then poured into ice water and the precipitate formed is filtered off under suction, washed neutral with water and dried. Recrystallised from petroleum ether, the 4,4'-dibromobenzilic acid isopropyl ester melts at 76–79°.

If, instead of 6.6 parts of isopropyl iodide, 3.4 parts of isopropyl chloride are used, then 4,4'-dibromobenzilic acid isopropyl ester is also obtained. It melts at 76–79°.

Second method 1.08 parts of concentrated sulphuric acid and 47 parts of isopropanol are added to a solution of 123.5 parts of 4,4'-dibromobenzilic acid in 300 parts by volume of abs. benzene and the solution is refluxed for 25 hours while separating off water. Finally, water is added to the reaction mixture, the benzene solution is washed neutral and dried over sodium sulphate. After distilling off the solvent, the crystalline residue is recrystallised from petroleum ether. The 4,4'-dibromobenzilic acid isopropyl ester melts at 76–79°.

Similar good results are obtained when using toluene in lieu of benzene in the above second method.

EXAMPLE 5

14.5 parts of 4,4'-dibromobenbilic acid are dissolved in 150 parts of dimethyl formamide, and 2.1 parts of potassium hydroxide are added to this solution. 5.7 parts of isobutyl bromide are then added dropwise to the clear solution and the mixture is stirred for 5 hours at 50–60°. The mixture is then poured into water and extracted several times with diethyl ether. The combined ether extracts are then washed with 2 N sodium hydroxide solution and then twice with water until they have a neutral reaction. The ether solution is dried and the ether is distilled off. The 4,4'-dibromobenzilic acid isobutyl ester so obtained melts, after recrystallisation from ether/petroleum ether, at 74–75°.

The following compounds are also produced analogously to the method described in Example 5 from a solution of 4,4'-dibromobenzilic acid in dimethyl formamide, potassium hydroxide and the corresponding alkenyl or alkinyl halide:

(a) 4,4'-dibromobenzilic acid allyl ester B.P. 166°/0.001 torr
(b) 4,4'-dibromobenzilic acid dichlorallyl ester, B.P. 175°/0.005 torr
(c) 4,4'-dibromobenzilic acid methallyl ester, B.P. 187–188°/0.003 torr
(d) 4,4'-dibromobenzilic acid propargyl ester $n_D^{20}=1.605$.

EXAMPLE 6

Production of the starting material
(4-bromo-4'-chlorobenzil)

(a) 23.4 parts of 4-bromophenyl acetic acid chloride are dissolved in 200 parts by volume of chlorobenzene and, at 5–10°, 20.5 parts of dry aluminium chloride are added in portions. The reaction mixture is then stirred at room temperature until no more HCl is split off. The mixture is then poured onto ice and extracted with ether. The ether extracts are washed with sodium bicarbonate solution and water until the washing liquor is neutral and dried; the ether is distilled off. The distillation residue, 4-bromobenzyl-4'-chlorophenyl ketone, melts at 70–75°.

(b) 45 parts of 4-bromobenzyl-4'-chlorophenyl ketone are dissolved in 436 parts by volume of acetanhydride and 24.1 parts of selenium dioxide are added. The reaction mixture is then refluxed for 4 hours. After cooling, the precipitate is filtered off under suction, selenium oxide is removed therefrom whereupon it is recrystallised from benzene. The 4-bromo-4'-chlorobenzil obtained melts at 200–203°.

Production of 4-bromo-4'-chlorobenzilic
acid isopropyl ester (c) 16 parts of 4-bromo-4'-chlorobenzil are added to a solution of 4.3 parts of potassium hydroxide in 12 parts by volume of water and 10 parts by volume of ethanol. The mixture is refluxed for 1 hour, then diluted with 100 parts by volume of water and covered with a layer of ether. The mixture is then acidified with concentrated hydrochloric acid while cooling well (acid to congo paper). The ether phase is then removed, washed with water and dried. After distilling off the ether, 4-bromo-4'-chlorobenzilic acid remains as a brown oil. The acid crystallizes from benzene/petroleum ether (value ratio 1:1); melting point 90 to 92° C.

(d) 5 parts of isopropyl bromide are added dropwise to 12 parts by volume of 4-bromo-4'-chlorobenzilic acid and 1.6 parts of potassium hydroxide in 150 parts by volume of dimethyl formamide and the whole is then refluxed for 6 hours at 50–60°. After cooling, 500 parts by volume of water are added to the mixture which is then again extracted with ether. The ether extracts are washed neutral with 2 N NaOH solution, dried and concentrated. Recrystallised from petroleum ether, 4-bromo-4'-chlorobenzilic acid isopropyl ester melts at 64–70°.

The following 4-bromo-4'-chlorobenzilic acid esters are produced in a manner analogous to that described in the above example:

4-bromo-4'-chlorobenzilic acid methyl ester
4-bromo-4'-chlorobenzilic acid ethyl ester
4-bromo-4'-chlorobenzilic acid-n-propyl ester
4-bromo-4'-chlorobenzilic acid-n-butyl ester
4-bromo-4'-chlorobenzilic acid-sec. butyl ester
4-bromo-4'-chlorobenzilic acid isobutyl ester
4-bromo-4'-chlorobenzilic acid allyl ester
4-bromo-4'-chlorobenzilic acid dichlorallyl ester
4-bromo-4'-chlorobenzilic acid methallyl ester
4-bromo-4'-chlorobenzilic acid propargyl ester

EXAMPLE I

Wettable powder

The following components are used to produce (a) a 50% and (b) a 10% wettable powder:

(a)

50 parts of 4-bromo-4'-chlorobenzilic acid isobutyl ester
5 parts of oleoyl methyl tauride sodium salt
2.5 parts of the disodium salt of dinaphthalene methane disulphonic acid
25 parts of calcareous earth-clay silicates
17.5 parts of kaolin (b)

10 parts of 4-bromo-4'-chlorobenzilic acid ethyl ester
3 parts of a mixture of the sodium salts of saturated fatty alcohol sulphonates (fatty alcohols=$C_8$–$C_{18}$)
5 parts of the disodium salt of dinaphthalene methane disulphonic acid
82 parts of kaolin.

The amounts of active substance mentioned are intimately mixed in suitable mixers with the additives and milled in corresponding mills and rollers. Wettable powders are obtained which can be diluted with water to form suspensions of any concentration desired. Such suspensions are mainly used for controlling spider mites in stone and pome fruit trees, citrus fruits, ornamentals of all types, vegetables, woody ornamentals and berry-bearing shrubs.

EXAMPLE II

Emulsion concentrate

The following components are mixed together to produce a 25% emulsion concentrate:

25 parts of 4-bromo-4'-chlorobenzilic acid isopropyl ester
10 parts of diacetone alcohol
2 parts of iso-octyl-phenoxy-polyoxyethylene ethanol
3 parts of emulsifier consisting of a mixture of the Ca salt of dodecylbenzene sulphonic acid and nonylphenol polyoxyethylene (e.g. P 140 HFP, produced by Union Chimique Belge, S.A., Brussels)
60 parts of xylene.

These concentrates can be diluted with water to form emulsions of any concentration desired. Such emulsions are used, e.g. to control *Tetranychus urticae, Metatetranychus ulmi* and *Bryobia pretiosa* (common spider mite, fruit tree spider mite and red gooseberry spider mite) on plum trees.

EXAMPLE III

Paste

The following substances are used to produce a 45% paste:

45 parts of 4-bromo-4'-chlorobenzilic acid methyl ester
5 parts of sodium aluminium silicate
14 parts of cetyl polyglycol ether (condensate from saturated $C_8$–$C_{18}$ fatty alcohols with 8 mols of ethylene oxide)
1 part of oleyl polyglycol ether (oleyl alcohol+5 mols of ethylene oxide condensate)
2 parts of spindle oil
10 parts of polyethylene glycol ether ("Carbowax")
23 parts of water.

The active substance is intimately mixed and milled with the additives in suitable apparatus. A paste is obtained from which, by dilution with water, suspensions of any concentration desired can be produced. Such suspensions are used, in particular, for controlling spider mites on useful plants and ornamentals and also on fruit trees.

EXAMPLE IV

Dust

To produce a 10% dust, 10 parts of 4-bromo-4'-chlorobenzilic acid isopropyl ester
5 parts of highly dispersed silicic acid and
85 parts of ground steatite are intimately mixed. Such a dust can be used, e.g. to control spider mites on vegetables and ornamentals as well as on woody ornamentals and berry-bearing shrubs.

Similar compositions useful for the same purposes are obtained by repeating Examples I to IV, but using therein as active ingredients any of the other compounds described in Examples 1 to 6.

In order to test the acaricidal properties of 4,4'-dibromobenzilic acid isopropyl ester, two series of tests were carried out with bean leaves infested with red spider mites (*Tetranychus urticae*) and all stages of their development. The bean leaves were treated with an aqueous emulsion containing 0.005% of 4,4'-dibromo-benzilic acid isopropyl ester (prepared from 25% emulsion concentrate). After 6 days, the mortality of all stages and the oviposition were determined and expressed in percent.

Red spider mites which were normally sensitive and resistant to known benzilic acid esters and phosphoric acid esters were taken as test animals. 4,4'-dibromo-benzilic acid isopropyl ester was compared with the known 4,4'-dichloro-benzilic acid isopropyl ester.

The test results are given in the following table.

TABLE I

| | | Percent of animals killed | |
|---|---|---|---|
| States of the test animals | Stock of spider mites | 4,4'-dichlorobenzilic acid isopropyl ester | 4,4'-dibromobenzilic acid isopropyl ester |
| Adults | Normal sensitive | 100:100 | 100:100 |
| Domant stages | | 60:20 | 100:100 |
| Eggs | | 50:30 | 100:100 |
| Adults | Resistant to 4,4'-dichloro benzilic acid ethyl ester. | 99:98 | 100:100 |
| Dormant stages | | 50:60 | 100:100 |
| Eggs | | 60:60 | 95:95 |
| Adults | Resistant to 0,0-diethyl-S-(2,5-dichlorophenyl)-thiomethyl)-dithio-phosphate. | 100:99 | 100:100 |
| Dormant stages | | 30:50 | 100:98 |
| Eggs | | 30:50 | 98:95 |
| Adults | Resistant to 0,0-diethyl-0-(2-isopropyl-4-methyl-6-pyrimidyl)-thiophosphate. | 95:100 | 100:100 |
| Dormant stages | | 60:70 | 100:100 |
| Eggs | | 60:60 | 100:99 |

These results clearly show that even in this low concentration, the new compound effects an almost 100% killing of the mites and *all* stages of their development, whereas the known compounds show the required results only against living stages but lacks sufficient effectiveness against dormant stages and eggs of the mites. Thus, the known compound is insufficient because the survival of eggs and dormant stages will readily cause a new infestation because the surviving animals will readily proliferate.

This test was repeated with red spider mites of normal sensitivity using the following test compounds:

A—4,4'-dibromobenzilic acid isopropyl ester
B—4,4'-dibromobenzilic acid methyl ester
C—4,4'-dichlorobenzilic acid isopropyl ester in a 0.05% concentration.

The following readings were taken 14 days after application of the test compounds showing the number of adults, dormant stages and eggs still alive:

TABLE II

| Compound | A | B | C | Control |
|---|---|---|---|---|
| Adults | 0 | 0 | 10 | 210 |
| Dormant stages | 0 | 0 | 12 | 140 |
| Eggs | 0 | 0 | 14 | 240 |

Apple trees of the species "Starking," infested with mites of the species *Panonychus ulmi* were sprayed with an emulsion of 4,4'-dibromo-benzilic acid isopropyl ester (prepared from 150 cc. of a concentrate containing 25% of active substance and 100 l. of water, yielding 37.5 g. of active substance in 100 l. of water) up to the run off. The surviving spider mites on 25 leaves of each test were counted 20 days after the treatment. The results are given in the following table.

TABLE III

| Compound tested | Mites per leaf after 20 days | Eggs per leaf after 20 days |
|---|---|---|
| 4,4'-dichloro-benzilic acid isopropyl ester | 20 | 8.0 |
| 4,4'-dibromo-benzilic acid isopropyl ester | 0 | 0.04 |
| Control, untreated | 224 | 480 |

The results show that the new compound exhibits a significantly higher acaricidal activity than the structurally closely related known compound.

It has also been determined that the 4,4'-dibromo-benzilic acid isopropyl ester according to the invention has a good action against eating insects such as, e.g. insects of the families Curculionidae, Bruihididae, Dermestidae, Tenebrionidae and Chrysomelidae, e.g. granary weevils (*Sitophilos granaria*), bean beetles (*Bruchidius obtectus*), larder beetles (*Dermestes vulpinus*), yellow mealworms (*Tenebrio molitor*) and especially against potato beetle (*Leptinotarsa decemlineata*), and their larval stages.

Potato plants infested with all stages of larvae of the potato beetle were treated with a 0.04% aqueous solution of 4,4'-dibromo-benzilic acid isopropyl ester and a 0.04% aqueous solution of 4,4'-dichloro-benzilic acid isopropylester.

The living larvae on the potato plants were counted one day and eight days after the treatment with the above-mentioned solutions. The test results are given in the following table.

TABLE IV

| Compound tested | Number of potato plants treated | Number of plants infested After 1 day | After 8 days |
|---|---|---|---|
| 4,4'-dibromo-benzilic acid isopropyl ester. | 28 | 1 (1 to 10 larvae per plant). | 0. |
| 4,4'-dichloro-benzilic acid isopropyl ester. | 28 | 10 (1 to 10 larvae per plant). | 10 (6 plants with 1 to 10 larvae per plant). |
| Control (untreated) | 14 | 14 (10 to 50 larvae per plant). | 14 (4 plants with 1 to 10; 3 plants with 10 to 50 and 7 plants with more than 50 larvae per plant). |

A field experiment was conducted in order to determine the relative acaricidal effectiveness of the following test compounds:

A—4,4'-dibromobenzilic acid isopropyl ester
D—4,4'-dibromobenzilic acid ethyl ester
E—4,4'-dichlorobenzilic acid ethyl ester for citrus rust mite (*Phyllocoptruta oleivora*) on grapefruit.

These compounds were tested in concentrations of 2 oz. of active ingredient/100 gal. and applied to single tree plots at 250 p.s.i. till run-off. The plots consisted of 4 year-old marsh seedless grapefruit trees bordered with single tree buffers. The entire experimental area was surrounded by a buffer row of trees.

Treatments were assigned in a completely randomized block design and replicated four times. Pre and post treatment infestations were determined by examining one 10 x 10 mm. field on the upper and lower leaf surfaces of 25 leaves per tree for a total of 100 leaves per treatment.

Readings took place weekly from the end of the first week to that of the fourth week after infestation.

Test results are presented below in Table V. The test compounds were applied just as the spring flush of growth had begun. The subsequent expansion of this growth resulted in a dilution effect in that the foliar surfaces originally treated increased in size some ten times. Rust mites normally migrate to this newer foliage as it matures. In addition to these factors, the close proximity of adjoining buffer trees provided optimum sources for a reinfestation.

TABLE V

| Compound | Infestation prior to application | Infestation subsequent to application at the end of - | | | |
|---|---|---|---|---|---|
| | | 1st week | 2nd week | 3rd week | 4th week |
| A | 87 | 0 | 0 | 0 | 0 |
| D | 98 | 0 | 0 | 0 | 2 |
| E | 96 | 4 | 11 | 13 | 14 |
| Control (untreated) | 90 | 80 | 82 | 89 | 92 |

These tests indicate superiority of Compounds A and D in citrus rust mite control over Compound E.

I claim:
1. A compound of the formula

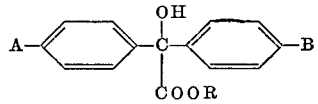

wherein R represents alkyl of from 1 to 4 carbon atoms, alkenyl of from 2 to 5 carbon atoms, dichloroallyl, or alkynyl of from 3 to 5 carbon atoms; one of A and B represents bromine, and the other of A and B represents chlorine or bromine.

2. A compound of the formula

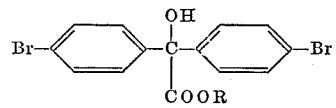

wherein R represents alkyl of from 1 to 4 carbon atoms, alkenyl of from 2 to 5 carbon atoms, dichloroallyl, or alkynyl of from 3 to 5 carbon atoms.

3. 4,4'-dibromo-benzilic acid isopropyl ester.
4. 4,4'-dibromo-benzilic acid methyl ester.
5. 4,4'-dibromo-benzilic acid ethyl ester.
6. A compound of the formula

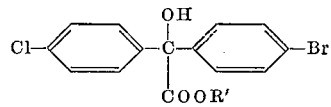

wherein R' represents alkyl of from 1 to 4 carbon atoms or alkenyl of 3 or 4 carbon atoms.

7. 4-bromo-4'-chlorobenzilic acid isopropyl ester.
8. 4,4'-dibromobenzilic acid.
9. 4-bromo-4'-chlorobenzilic acid.

References Cited
UNITED STATES PATENTS
2,745,780   5/1956   Hafliger _____ 260—473 A LORRAINE A. WEINBERGER, Primary Examiner
R. S. WEISSBERG, Assistant Examiner U.S. Cl. X.R.
260—520, 590; 424—308

PO-1050
(5/69)

UNITED STATES PATENT OFFICE
CERTIFICATE OF CORRECTION

Patent No. 3,639,446          Dated Feb. 1, 1972

Inventor(s) Kurt Gubler

It is certified that error appears in the above-identified patent and that said Letters Patent are hereby corrected as shown below:

Col. 11, lines 41 and 42 should appear immediately following Table V.

Signed and sealed this 11th day of July 1972.

(SEAL)
Attest:

EDWARD M. FLETCHER, JR.
Attesting Officer

ROBERT GOTTSCHALK
Commissioner of Patents